April 15, 1941.
R. S. SANFORD.
2,238,133
TRANSMISSION MECHANISM
Filed Sept. 27, 1935
5 Sheets-Sheet 1
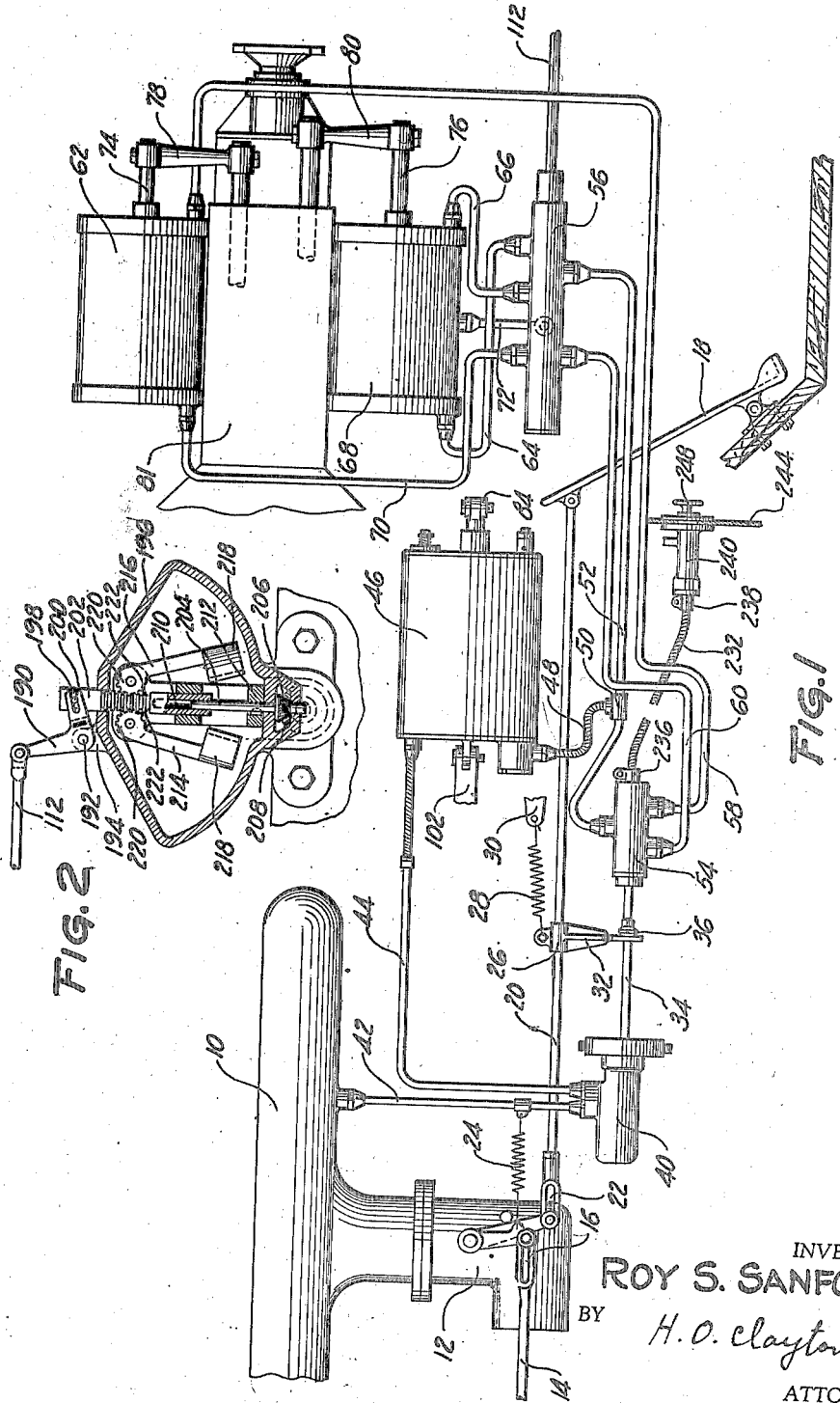
INVENTOR.
ROY S. SANFORD
BY
H. O. Clayton
ATTORNEYS April 15, 1941.

R. S. SANFORD 2,238,133

TRANSMISSION MECHANISM

Filed Sept. 27, 1935

INVENTOR.
Roy S. Sanford
BY H. O. Clayton
ATTORNEYS

April 15, 1941.　　　R. S. SANFORD　　　2,238,133
TRANSMISSION MECHANISM
Filed Sept. 27, 1935　　　5 Sheets-Sheet 4
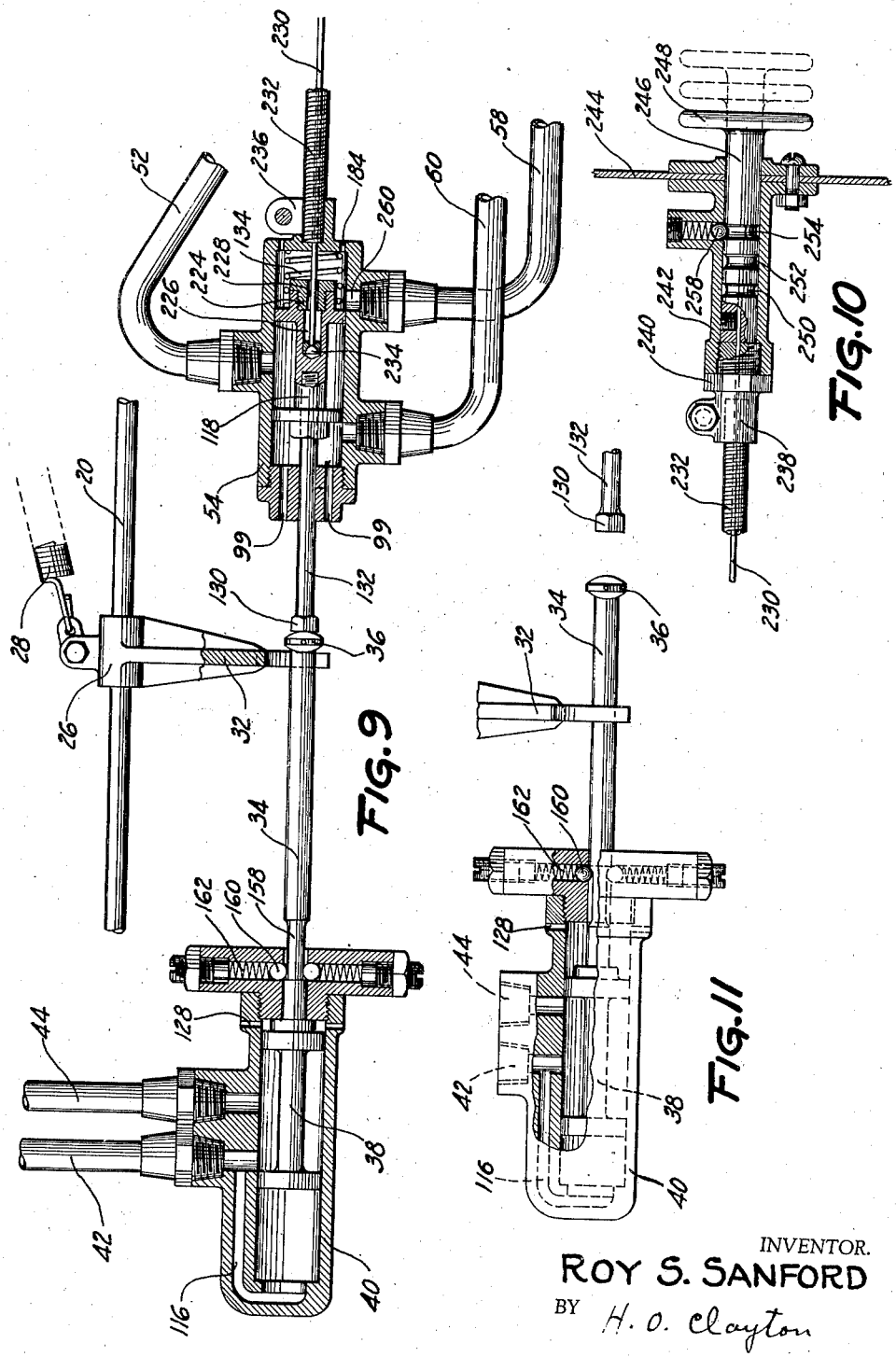
INVENTOR.
ROY S. SANFORD
BY H. O. Clayton
ATTORNEYS

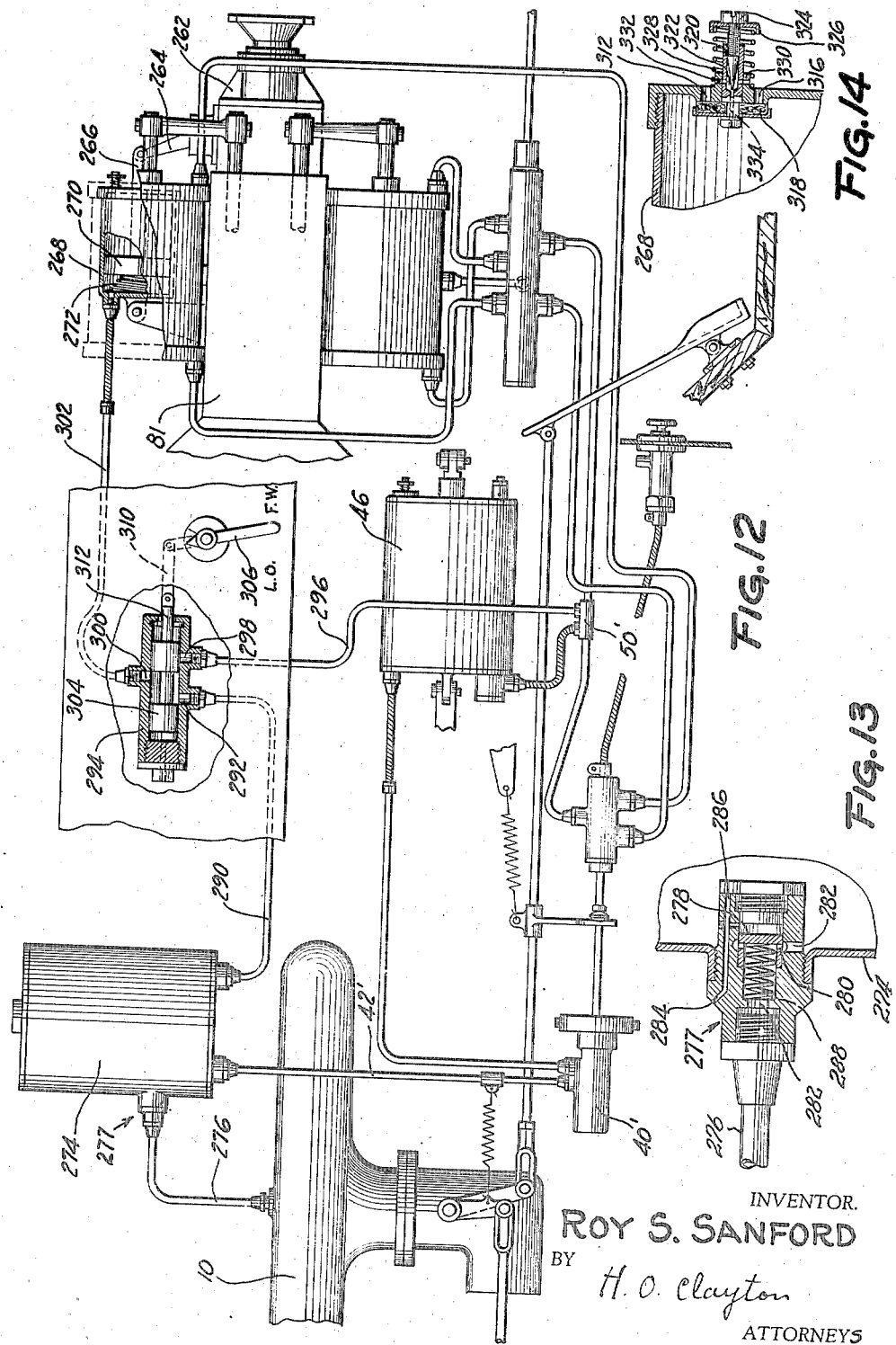

Patented Apr. 15, 1941

2,238,133

UNITED STATES PATENT OFFICE 2,238,133

TRANSMISSION MECHANISM

Roy S. Sanford, New York, N. Y., assignor to Bendix Products Corporation, South Bend, Ind., a corporation of Indiana Application September 27, 1935, Serial No. 42,419

5 Claims. (Cl. 192—.01)

My invention relates to vehicle control mechanism and has particular reference to automatically operable change-speed mechanism, substantially eliminating the necessity of manual effort on the part of the vehicle driver.

An object of the invention is to utilize power derived from the internal-combustion engine of a motor vehicle for actuating the customary transmission mechanism ordinarily manipulated by hand through a gear shift lever. More particularly, I contemplate utilizing the vacuum produced by said engine for this purpose.

A further object of the invention is to utilize the same power source for the purpose of automatically throwing out the clutch between the engine and the drive shaft in proper timed relation to the gear shifting operation. An important feature of the invention resides in the control mechanism and the manner in which the various elements thereof are associated, whereby the declutching and gear shifting operations are automatically accomplished in proper timed relation to the releasing and depressing operations of the accelerator pedal, which controls the fuel supply. By virtue of this particular association of control units and the timed relation therebetween it is unnecessary for the driver of the vehicle to learn anything new for the purpose of properly operating the same. The operations specified take place automatically when the driver manipulates the accelerator pedal in the manner in which he is already accustomed in conjunction with the ordinary manually operable control units.

An important feature of the invention resides in the arrangement whereby complete declutching is insured prior to automatic operation of the transmission mechanism, thereby eliminating the possibility of clash or stripping of the gears. Another feature of importance resides in the particular valve control utilized whereby sufficient vacuum power from the combustion engine to perform the aforesaid operations is assured with or without utilizing an auxiliary vacuum tank as an added source of vacuum supply. The rise and fall of the vacuum power available from the intake manifold of the combustion engine in accordance with the load of the engine is well known. My improved valve control arrangement insures the building up of sufficient vacuum in the operating lines to completely perform all of the aforesaid operations, regardless of any momentary drop in the vacuum available from the intake source.

A further object of the invention is to incorporate manually operable control mechanism, easily accessible to the driver of the vehicle, for adjusting the vacuum power line in such manner that the transmission will automatically be thrown in reverse gear upon depression of the accelerator pedal, when such backward movement is desired. An important feature resides in the control means whereby the transmission gears may be maintained in neutral position, when the driver desires to race the motor for warming up the engine, et cetera.

Still another object of the invention resides in the manner in which the vacuum power lines are automatically controlled to insure complete shifting of the transmission gears prior to re-engagement of the clutch for driving purposes.

Still a further feature of importance resides in the association of a free-wheeling unit with the transmission mechanism and the provision of means automatically operable, when such free-wheeling mechanism is in the locked-out position, to throw the said unit into free-wheeling during the period of gear shifting. Since the clutch providing a drive engagement between the engine and the drive shaft is positioned forwardly of the transmission and since the free-wheeling unit is positioned rearwardly thereof, simultaneous declutching and operation of the free-wheeling unit will unload both ends of the transmission so that gear shifting may be accomplished without clash. An important feature also resides in the arrangement whereby the vacuum power may be utilized to control the position of the free-wheeling unit. The means for determining the position at which such free-wheeling unit is to be normally retained may be located conveniently upon the dash panel.

Various other objects and meritorious features of the invention will be apparent from the following description taken in conjunction with the drawings, wherein like numerals refer to like parts throughout the several figures and wherein:

Figure 1 is a side elevation of the assembled mechanism, somewhat diagrammatic for illustrative purposes;

Figure 2 is a section through the speed control mechanism utilized in association with the automatic gear shifting mechanism;

Figure 9 is a section through what may be regarded as the primary and secondary control valves;

Figure 10 is a section through the dash positioned reverse and neutral valve adjustment;

Figure 11 is a section through the primary control valve illustrated in section in Figure 9, said valve being in the position occupied just prior to closing the vacuum lines;

Figure 12 illustrates diagrammatically a control system similar, but slightly modified as to detail, to that illustrated in Figure 1, wherein a free-wheeling control is incorporated;

Figure 13 is a section through the one-way valve with the auxiliary vacuum tank forming a part of the system in Figure 12; and Figure 14 is a section through the air valve in the power cylinder mechanism shown in Figure 12.

Figure 3:
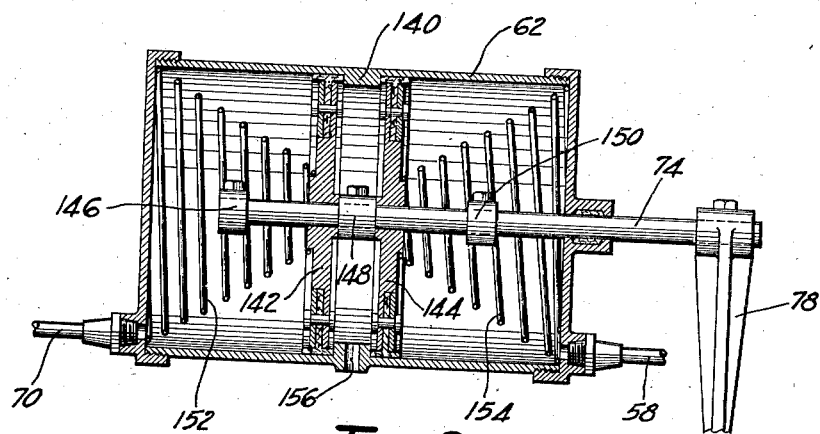
Figure 3 is a section through the vacuum operated power cylinder controlling first and reverse speeds.
Figure 4:
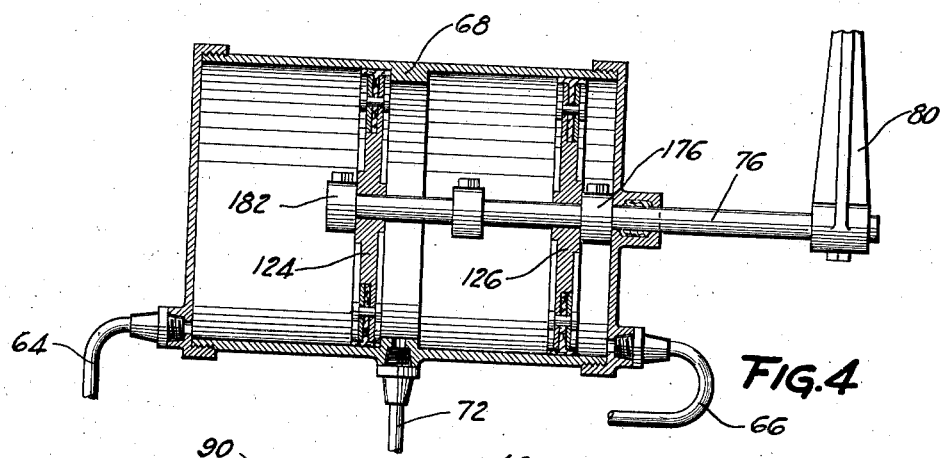
Figure 4 is a section through the booster cylinder controlling second and third speeds.
Figure 5:
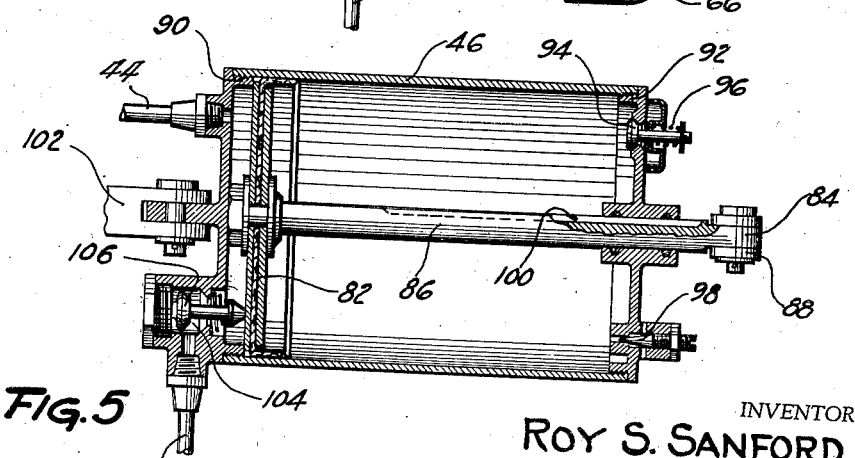
Figure 5 is a section through the clutch operating power cylinder.

Referring now to the diagrammatic illustration of Figure 1, numeral 10 represents an intake manifold associated in conventional manner with the engine of a vehicle. A carburetor 12 is associated therewith, said carburetor being manipulated from the hand throttle by a rod 14 through a lost motion connection 16 and operable by an accelerator 18 through rod 20 and lost motion connection 22. A spring 24 is positioned in conventional manner to normally urge the butterfly valve of the carburetor into motor idling position. Both the hand throttle which is usually mounted on the dash and the foot operated accelerator may be defined as fuel control elements.

Fixedly positioned by the accelerator rod 20 is a bracket 26 to which is secured one end of a spring 28, the other end of said spring being secured to some fixed portion of the vehicle as indicated at 30. The bracket includes a depending arm 32 apertured at its extremity to permit valve rod 34 to slide therethrough. Said rod is provided at its extremity with an enlarged head 36, whereby the forward movement of the rod is limited by the position of the bracket 26. It will be apparent therefore that depression of the accelerator pedal 18 will first take up the slack in the lost motion connection 22 without opening the carburetor valve and at the same time move the bracket 26 forwardly, thereby permitting forward movement of the valve rod 34.

Valve rod 34 is integral with, or in some fashion connected to, spool valve 38 in a primary control valve 40. In its retracted or rearward position, as illustrated in Figures 1 and 9, the valve 40 opens the vacuum line 42 extending from the intake manifold to communication with vacuum line 44 extending to the clutch operating power cylinder 46. From the clutch booster cylinder a vacuum line 48 communicates through a three-way fitting 50 with line 52, one end of which communicates with a manually operated secondary control valve 54 and the other end of which communicates with a portion of a governor controlled valve 56. The valve 54 constitutes a selector means and the valve 56 a speed responsive means for in large measure controlling the operation of the transmission operating mechanism. The secondary control valve 54 or selector communicates through lines 58 and 60 with a power cylinder 62 and the speed controlled valve 56 respectively. Communicating passages 64 and 66 extend from the valve 56 to opposite ends of the booster cylinder 68 and another vacuum line 70 extends from the said valve to the end of booster cylinder 62 opposite to that into which line 58 opens. Conduit 72 provides communication between the central portion of power cylinder 68 and the valve 56 for purposes of venting the central portion of said cylinder to air in a manner clearly described hereinafter. Power cylinders 62 and 68 are provided with piston actuated stems 74 and 76 respectively which operate shifting forks 78 and 80 to shift gears within the transmission 81 in the same manner as such shifting forks operate in a conventional lever actuated structure.

As hitherto stated, Figures 1 and 9 illustrate the primary control valve 40 in position to establish communication between the intake manifold and the clutch operating power cylinder 46. The vacuum created by the motor draws the piston 82 forwardly in the cylinder 46, thereby throwing out the clutch through the connection 84 between the piston stem 86 and the clutch actuating lever 88.

Power cylinder 46 comprises a cylinder casing, the open ends of which are closed respectively by integral threaded heads 90 and 92. The head 92 includes a one-way valve 94 operable against the coil spring 96 to admit air to the cylinder when the piston 82 is moving in clutch release direction. The rear end of the power cylinder 46 is vented to air at all times through the adjustable vent 98. Piston stem 86 is provided with a slot 100 extending from the rear extremity thereof to a point somewhere near the piston 82 for purposes to be described more fully hereinafter.

The closure head 90 is fixedly positioned with relation to the chassis, as by means of some fixed element 102, and includes a communicating passage 104 which is normally closed by a valve 106. Passage 104 communicates with a line 48 extending to the three-way fitting 50. It will be noted that the valve 106 cannot be actuated by the piston 82 to open the vacuum line 48 until the piston 82 has reached substantially the limit of its movement in clutch release direction. It will therefore be apparent that line 48 is not opened to vacuum until the clutch between the engine and the transmission has been completely released.

Figure 6:
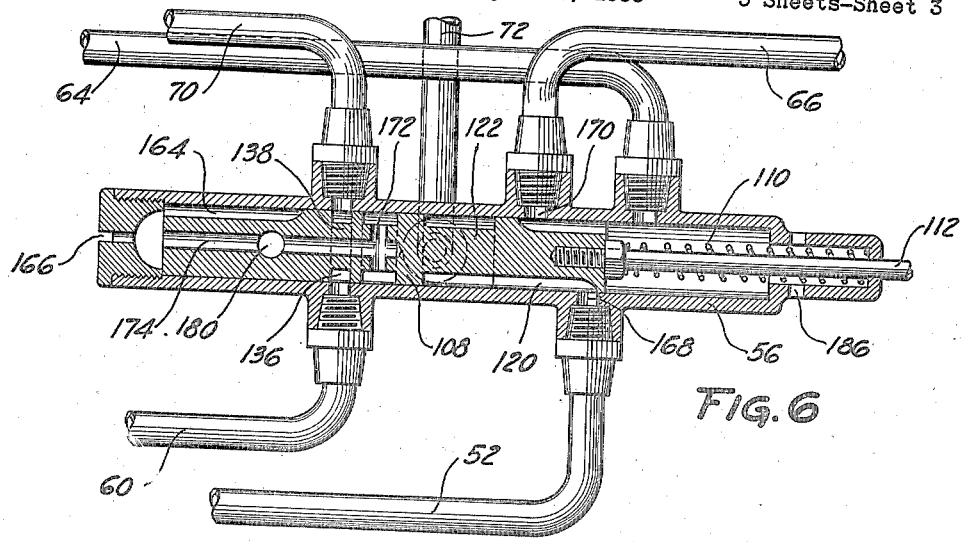
Figure 6 is a section through the speed controlled gear shift valve, the parts thereof being illustrated in first speed position.

Assuming that the vehicle is standing still, with the accelerator raised as indicated in the drawings, the valve 108 of the speed controlled valve 56 will be in the position illustrated in Figure 6. This valve is actuated against the resistance of a coil spring 110 by any desirable type of speed control mechanism such as that illustrated in Figure 2. The connection between the speed control mechanism and the valve 108 is secured through rod 112.

The structure and operation of the various valve mechanisms and their associated power cylinders may best be explained by describing the operation of the entire device beginning with the point at which the motor is idling, the gears in neutral, and the vehicle standing still. Under such conditions the accelerator pedal will be in its fully released position, as illustrated in Figure 1, thereby retaining the spool valve 38 of primary control valve 40 in the position illustrated in Figure 9. It will be noted that the primary control valve 40 includes a by-pass 116, which connects the vacuum line 42 with the forward end of the valve chamber. The vacuum in line 42 at this time will operate through the vacuum line 44 to the clutch operating power cylinder 46 to throw out the clutch by movement of the piston 82. Upon completion of this clutch disengaging movement the valve 106 will be actuated to open passage 40.

The three-way fitting 50 permits the vacuum to operate both forwardly and rearwardly along the line 52. As illustrated in Figure 9, the spool valve 118 of secondary control valve 54 is positively retained in the position illustrated when the accelerator pedal is released. In this position, the lines 58 and 60 are closed to vacuum by the said spool valve 118. The rear end of line 52 is open, however, and, as clearly illustrated in Figure 6, the vacuum passes through a grooved passage 120 in valve 108, through the annular open space provided by the restricted neck portion 122 of said valve, and thence up through conduit 72 into the central portion of the gear shift booster 68. It will therefore be apparent that the pistons 124 and 126 of said gear shift booster are drawn toward the center of the power cylinder at this stage to maintain a neutral position of these particular gears. The first and reverse speed gears are normally retained in neutral by the springs 152 and 154 in power cylinder 62.

With the mechanism in position as illustrated in Figure 1, the car is standing still and the accelerator pedal fully released. The speed control mechanism, Figure 2, is not operating because the car is not moving.

Depression of the accelerator pedal to the point where the lost motion 22 is absorbed permits the valve 118 to move to its leftward position. Also, the arm 32 is moved forward, allowing the valve stem 34 and spool valve 38 to move to the position shown in Figure 11. This position is established however only after the various lines have been exhausted, as described in detail hereinafter, and the secondary valves have shifted to vent the central position of the valve 38. The vacuum manifold has been in connection with clutch operating power cylinder 46 through line 44 and the clutch has been in the release position. As the lost motion in accelerator rod is taken up and valve 118 moves to its leftward position, the line 60 will be closed to air vents 99 and placed in communication with the lines 48 and 52 from the clutch control cylinder. Air will therefore be drawn from the left end of booster 62 through line 70 through speed controlled valve 56 and line 60 and line 52 and line 48. As this air is drawn from the power cylinder 62 and the lines mentioned above, the clutch control piston will move toward the clutch engaging position. As soon as the valve 106 closes by virtue of the clutch control power cylinder piston, full vacuum will again be restored in the clutch control cylinder and will move the clutch control piston leftwardly, again opening the valve 106, thus drawing more air from cylinder 62. The clutch control piston will probably shuttle in this manner two, three or four times until all the air is exhausted from cylinder 62.

Removal of the head 36 from abutting relation with the head 130 of valve stem 132, which is secured to the spool valve 118 in the secondary control valve, permits the coil spring 134 to push said valve 118 to the forward limit of its movement. The forward end of line 52 is then in communication with line 60, which opens into valve port 136 in the speed controlled valve 56. At this stage, the vehicle being stationary, valve 108 is in the position illustrated in Figure 6 and a restricted neck portion 138 of said valve 108 provides an annular passageway permitting the vacuum in line 60 to operate through line 70, which opens, as clearly indicated in Figure 3, into one end of gear shift cylinder 62.

This cylinder includes a shouldered portion 140 which extends around the inner circumferences of the cylinder at substantially the center, which shoulder acts as a stop limiting the inward movement of the two pistons 142 and 144. Adjustably positioned in axially spaced relation to one another upon the rod 74 are three stop members 146, 148, and 150. These stop members limit the movement of the respective pistons 142 and 144 along the rod 74.

A vacuum being established through line 70 in the forward end of cylinder 62, this vacuum cooperates with the air vent 156 to force the piston 142 against the resistance of spring 152. After a portion of ineffective travel along the rod 74, the piston 142 will abut the end of stop member 146 and on continued movement will draw the rod 74 forwardly along with the gear shifting fork 76 to throw the transmission gears into first speed. As soon as all the air is exhausted from cylinder 62, as explained above, the vacuum at the left end of valve 38 created by passage 116 will be sufficient to overcome the restraining force of the ball checks 160, and as soon as the arm 32 is out of the way the control valve 38 will move leftwardly to the extent of its travel, thus shutting off the vacuum from line 44 and opening it to air through vents 128. The clutch control piston will now move towards the clutch engaging position. The first part of this movement will be rapid as the air in the cylinder will be vented through slot 100. When the slot 100 is covered, the air will then be vented through adjustable bleed valve 98, cushioning the clutch engagement as desired. Now the clutch is engaged and the car is moving in first speed. It will be noted that instead of having vacuum in any lines all lines are open to air. The transmission will now remain in first speed by virtue of the fact that there is a friction due to the driving power of the engine which holds the first speed gears in mesh. As soon as the accelerator pedal is released, the first speed gears will be disengaged by the spring 152, unless the speed of the car is such that the first speed line is still open, as explained above, when the piston 142 would again pull the first speed gears into mesh.

Referring now to Figures 9 and 11, it has been stated that the spool valve 38 will be moved forwardly when such movement is permitted by forward movement of the bracket 26 on the accelerator rod 20. An important feature of the structure resides in the means illustrated in these two figures, momentarily stopping the closing movement of the spool valve 38 prior to actual closing of the vacuum line 44 for the purpose of insuring a sufficient amount of vacuum in the lines to perform the desired operation. The need for an auxiliary vacuum tank is illustrated in this way. The valve rod 34 is provided with a restricted portion 158 adapted to cooperate with spring pressed check balls 160 to momentarily arrest the forward movement of the spool valve in the position illustrated in Figure 11. The springs 162 urging the balls against the valve rod 34 may be adjusted to determine the vacuum power which must be built up in the forward end of primary control valve 40, and simultaneously in the vacuum lines through conduit 44, before the spool valve 38 continues its forward movement to shut off the vacuum lines from the vacuum source.

Figure 7:
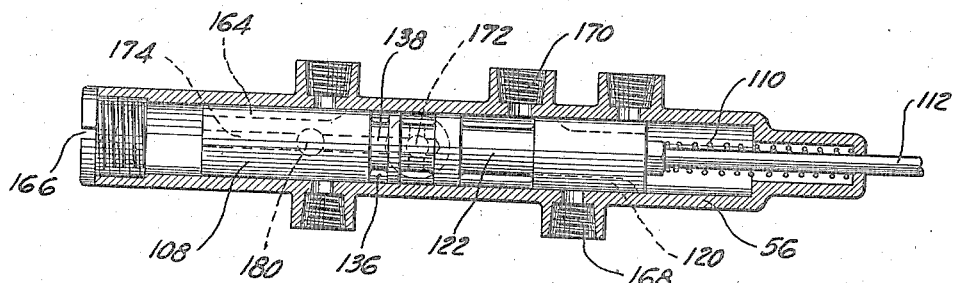
Figure 7 illustrates the same valve in second speed position.

The car is now moving forwardly in first speed, and when the operator is ready to shift into second the normal action is to release the accelerator pedal. Shifting into second occurs automatically upon such release in the manner hereinafter described. The vacuum lines are again opened by rearward movement of spool valve 38 through the one-way connection of the bracket 26 with the valve stem 34. Spool valve 118 is again positioned as illustrated in Figure 9 as the head 130 abuts head 36. The clutch is thrown out initially upon operation of the piston in booster cylinder 46 prior to opening the line 52. At this point the vehicle has gained sufficient speed to draw the valve 108 in the speed controlled valve 56 to the position illustrated in Figure 7. In this position, the forward end of the gear shift booster 62 has been vented to air through a slot 164 in the valve 108, access to the atmosphere being had through a vent 166 in the forward end of the speed controlled valve 56. Therefore, first and reverse speed gears are disengaged. Simultaneously, communication is established with the right-hand end of cylinder 68 through the line 52 which opens into port 168, which port registers with slot 120 in valve 108 leading to the annular space provided by the restricted neck 122. Communication is thus established with the port 170 and the vacuum operates through line 66 connected with said port to the rear end of cylinder 68. At this point the central part of said cylinder 68 is vented to the air through line 72, which line is opened to the atmosphere through a transverse passage 172 in the valve 108, said transverse passageway connecting with an axial bore 174 extending forwardly through said valve to the atmospheric pressure established in the forward end of the valve through the vent 166. The piston 126 in gear shift cylinder 68 is therefore urged against the stop member 176 to actuate the shifting fork 80 to throw the transmission gears into second speed. The speed controlled valve 108 prevents slipping back into first gear when the accelerator is released momentarily. The vehicle may be driven at as high speed as desired in second so long as the accelerator is not released in the third speed range.

Figure 8:
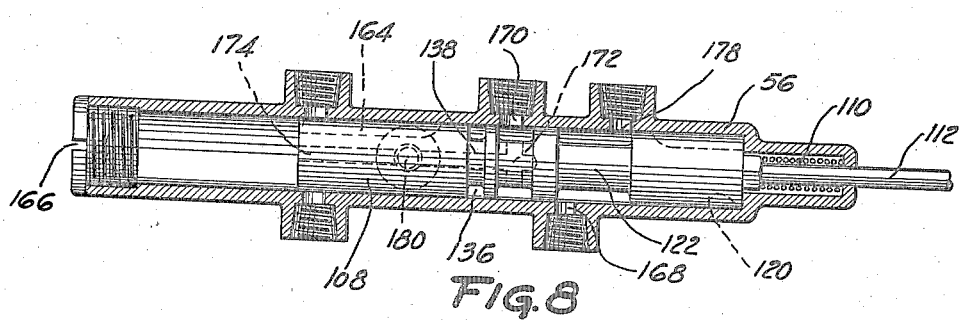
Figure 8 illustrates the valve in third speed position.

Subsequent movement of the accelerator pedal 18 will close the vacuum line by operation of the primary control valve 40 as hitherto explained. When sufficient speed has been attained to warrant shifting into third, the accelerator pedal is again relieved, whereupon the vacuum lines are opened, the clutch motor 46 operates to throw the clutch out, and the following action takes place by reason of the changed position of valve 108 in the speed controlled valve 56. It must be remembered that movement of this valve is dependent entirely upon the speed of the vehicle. The vacuum will operate through line 52 rearwardly, as explained in conjunction with the shift into second. However, valve member 108 will have moved to the position illustrated in Figure 8. In this position communication is established between line 52, through port 168, and line 64 by reason of the fact that the port 178 is open to the annular space provided by the restricted neck 122 of the said valve 108. At the same time cylinder 68 between pistons 124 and 126 is vented to air by registration of the transverse passage 180 in the valve 108 with the line 72. Simultaneously, air is admitted to cylinder 68 on the right-hand side of piston 126 by reason of the registration of transverse passageway 172 with the port 170. It will be apparent therefore that the suction on the left side of piston 124 draws the piston leftwardly in the cylinder and by reason of its contact with the stop member 182 draws the rod 76 along with the shifting fork 80 to shift the transmission gears from second to third speeds. Upon depression of the accelerator pedal the line 44 will be closed to vacuum and open to air as soon as the primary control valve 40 operates, as previously explained.

It will be seen that during movement of the vehicle the accelerator pedal may be manipulated as desired without any particular care on the part of the operator, because the position of the speed controlled valve 56 determines the particular gear in which the transmission operates. If the accelerator pedal is released while the vehicle is in third speed and the speed drops to the second speed range, the second speed vacuum line 66 will be opened and the transmission will automatically be placed in second speed. If the accelerator pedal is left in released position and the speed of the vehicle drops to first speed range, the vacuum line 72 will be opened and the transmission is thrown into neutral. The secondary control valve 118 cuts off the first speed line 60 from communication with vacuum source. For this reason the vehicle can never be in gear when standing still.

By reason of slot 100 in the piston stem 86 associated with the clutch operating power cylinder air is permitted to escape rapidly from the rear end of said cylinder during initial movement of the piston in clutch release direction. However, as the end of the cylinder is approached, the slot outlet will be closed and the remaining air trapped in the cylinder can escape only through the adjustable valve 98. In this way a cushion effect is secured during the final movement of the piston and an easy reengagement or engagement of the clutch is assured.

Another important feature inherent in the control mechanism hitherto described resides in the fact that the piston 82 of the clutch control motor can not move rearwardly sufficiently far to permit reengagement of the clutch until the gear shifting operation is completed. The reason for this is that the vacuum operating through the lines to any one of the gear shift motors must necessarily have become sufficiently powerful to perform the gear shifting operation before the primary control valve 40 closes the lines from the vacuum source, as hitherto explained. This is true by reason of the momentary check acting on the valve 38 through the spring pressed balls 160.

The second and third speed transmission gears are maintained in any of the various speed relationships in conventional manner not disclosed herein, since the means utilized has nothing whatever to do with the particular invention here involved.

Reference now being had to the speed controlled mechanism illustrated in detail in Figure 2, the actuating shaft 112 is pivotally connected to a rocker arm 190, which rocker arm is pivotally positioned as at 192 to a bracket 194 projecting away from the housing 196 of the mechanism. The other extremity of the rocker arm is provided with a slot 198 engageable with a pin 200 positioned at one extremity of a shaft 202 extending into the housing 196. A shaft 204 is rotated through engagement of pinion 206 with a part rotated by the drive shaft of the vehicle, to which part is secured a pinion 208, and this shaft extends into a bore 210 provided in the lower extremity of the shaft 202. A sleeve 212 is secured to the shaft 204, which sleeve is provided at its upper extremity with brackets to which are pivoted the arms 214 and 216. The outer ends of these arms are weighted as indicated at 218 and the pivotal ends thereof include teeth 220 adapted to mesh with a rack portion 222 provided adjacent the upper extremity of the shaft 202. It will therefore be apparent that as the shaft 204 is rotated, the sleeve 212 will rotate therewith and the arms 214 and 216 will be moved outwardly by the centrifugal force developed. This action will cause sliding movement of the shaft 202 and consequent rocking movement of the rocker arm 190 about its pivotal point to actuate the shaft 112 which, in turn, actuates the speed controlled valve 108.

Means have also been provided operable from the dash of the vehicle, or from any other convenient position, to control the vacuum lines for permitting shifting into reverse automatically or to permit racing of the motor without shifting into any gear. This means has been illustrated more clearly in Figures 9 and 10. The rear end of spool valve 118 of secondary control valve 54 is closed by a threaded closure 224, the interior of said valve being provided with a bore 226, which is extended rearwardly throughout the length of the spool valve through a smaller bore 228 provided in the said closure member. One end of a cable 230, adapted to slide within a conduit 232, extends into the bore 226 and is provided with an enlarged head 234 adapted to slide therein between the forward limit of the bore and the restriction provided by the bored closure 224.

The conduit 232 is secured in a bracket clamp 236 at one extremity and in a similar clamp 238 at the other extremity, this latter bracket clamp constituting a portion of a threaded cap 240 positioned in one open extremity of a cylinder 242 which may be secured to a dash panel 244. Slidable within this cylinder 242 is a plunger 246 adapted for manual manipulation by means of head 248. The other end of cable 230 is secured to this plunger, the cylindrical surface of which is provided with a plurality of annular grooves 250, 252, and 254 in which a spring pressed ball 258 is adapted to seat.

Figures 9 and 10 illustrate the parts hitherto described in position to permit shifting to all forward speeds. When the member 246 is drawn rearwardly so that the ball 258 engages the annular groove 252, the head 234 at the opposite end of the cable 230 will have been drawn rearwardly to a point at which it abuts the closure 224 provided for the rear end on the spool valve 118. Under these circumstances it will be apparent that the said spool valve 118 cannot move forwardly when the abutting head 36 is removed to permit sliding movement of valve rod 132. As hitherto explained, such sliding movement of the valve rod and spool valve 118 in a forwardly direction occurs prior to opening the vacuum lines to permit shifting into first gear. Since the spool valve is positively held against such movement by the cable 230, the accelerator may be depressed spasmodically as much as desired without opening the vacuum lines for shifting into first. This particular adjustment is necessary to permit racing the motor for warming up purposes, et cetera.

When member 246 of the dash control is pulled further rearwardly, the spring pressed ball 258 will engage annular groove 250 to retain it in its rearmost position. In this position the spool valve 118 will have been drawn rearwardly against the resistance of spring 134, thereby opening the port 260 for communication with the vacuum line 52 and closing the same to the air vents 184. This permits operation of the vacuum through the line 68, which extends to the rear end of gear shift motor 62, thereby cooperating with the air vent 156 in said motor to force the piston 144 to the right against the resistance of spring 154 to actuate the shifting fork 78 to throw the transmission into reverse gear. The operation of the clutch motor 46 during reverse shifting of the transmission gears is exactly the same as explained in conjunction with shifting in the forward speeds.

A somewhat modified control assembly has been illustrated diagrammatically in Figure 12. In this system a free-wheeling unit 262 is shown mounted on the rear of the transmission 81. A lever 264 is operable to throw the free-wheeling unit into free-wheeling or locked-out position in a manner well known to the art. This lever is pivotally connected to the piston stem 266 of a free-wheeling control motor 268, the piston 270 of which operates by vacuum against the resistance of a coil spring 272 to maintain the unit in free-wheeling position.

Inasmuch as the vacuum from the intake manifold is utilized to maintain the free-wheeling unit in free-wheeling position, it is desirable that a constant adequate source of vacuum be assured, and for that reason an auxiliary vacuum tank 274 is connected with the intake manifold 10 through the conduit 276 and the one-way valve 277 illustrated in Figure 13. This valve includes a spring pressed plunger 278 provided with openings 280 adapted to register with vacuum passages 282 when the plunger is in its forward position as illustrated in Figure 13. The rear extremity of the valve casing is vented to air through the passages 284 and 286, whereby the plunger 278 is forced into the position illustrated in Figure 13 when vacuum from the intake manifold has reached the interior of the valve on the other side of the said plunger 278. When the vacuum in line 276 is insufficient to overcome the resistance of the spring 288, then port 282 will be closed, thereby preventing any decrease in the vacuum already attained in tank 274.

The vacuum conduit 42' extending from tank 274 to primary control valve 40' is the same in a functional way as line 42 of the system illustrated in Figure 1, and the remainder of the gear shifting system and vacuum line control relating thereto is precisely the same as that already described. However, a line 290 extends from tank 274 to port 292 in free-wheeling control valve 294. Another line 296 extends from another port 298 in said control valve to fitting 50', which latter differs from the fitting 50 illustrated in Figure 1 only in that it is a four-way connection rather than a three-way affair. The control valve 294 is provided with a third port 300 to which line 302 is connected to provide communication with the free-wheeling control motor 268. A spool valve 304 may be manually manipulated through control arm 306 positioned on the dash, or any other desirable member, and connected in suitable fashion, as through link 310, to the projecting stem 312 of the said spool valve.

The free-wheeling control has been illustrated in free-wheeling position, wherein the spool valve is arranged to provide constant communication between the booster 268 and the vacuum tank 274. When the manual control arm 306 is moved to "locked out" position, the port 292 communicating with the tank 274 will be closed and ports 300 and 298 will be opened to communication. Under such adjustment the vacuum will operate through line 296 after passing into the clutch control motor 46 to operate the free-wheeling control booster 268. In this way both ends of the transmission 81 will be unloaded during the gear shifting manipulation, which avoids any possibility of clash and insures silent, rapid operation of the transmission.

The free-wheeling control motor 268 is provided with an adjustable air vent illustrated in Figure 14. The vents 312 and 316 are normally closed on the inside by a valve head 318 positioned on the inner extremity of valve stem 320. The valve stem is slidable through the end of the motor cylinder and includes a bore 322 into which an adjusting needle 324 is threaded. A washer 326 provides a seat for one extremity of coil spring 328, the other end of which is seated upon the exterior of the motor cylinder casing, thereby normally urging the valve 318 to close the ports 312 and 316. A boss 330, through which the valve stem 320 extends, is radially apertured as indicated at 332, these apertures registering with corresponding apertures in the valve stem 320 when the valve ports are in the positsion illustrated in Figure 14, the large ports 312 and 316 being closed. The bore 322 is provided with access to the interior of the cylinder through a restricted passage 334.

Thus it will be apparent that valve 318 will unseat to admit a rush of air when the opposite end of the motor 268 is opened to vacuum to draw the piston 270 forwardly. On the other hand, ports 312 and 316 will be closed on movement of the piston 270 in the reverse direction, and the exhaust of air will take place through the restricted passage 334 and the registering apertures in the valve stem and the boss 330. The speed of this exhaust may be controlled by adjusting the needle 324 in the valve stem 320 so that the forward unit will not move to locked-out position until the motor speed has reached the vehicle speed and the unit has engaged in the forward position.

A further description of the operation of the device under varying circumstances will render the utility of the structure more apparent. When the accelerator pedal is depressed by the operator, the transmission mechanism being in third speed as under normal driving conditions, it may be desirable to gradually lift the said accelerator until the speed of the vehicle is very low, say three or four miles per hour without desiring to shift gears. Under such circumstances the accelerator pedal will not be fully released and will not reach the point where the lost motion in the carburetor connection becomes operative. The transmission will then remain in third speed until such time as the lost motion connection does become operative, at which point further release of the accelerator pedal will open the primary control valve 38 to exhaust air from the clutch operating power cylinder. At this point the valve stem 34 will center the secondary valve 118 which, as hitherto stated, cuts off vacuum communication with the vacuum lines extending to the first speed transmission piston 142. At the same time the speed controlled valve 108 permits the exhaust of air through vacuum lines 52 and 72 from the right side of the piston 124, the left side of which will be vented to air through the vents 186 in the speed controlled valve casing. This disengages the transmission gears from their third speed relation. At the same time the right-hand side of the second and third speed motor cylinder 68 will also be vented to air through line 66, thereby permitting the exhaust of air through 72 to center the two pistons 124 and 126 in the cylinder 68. In this position the transmission assembly is in a neutral position.

Where the accelerator pedal is released in third speed and the car is permitted to coast, there will be an immediate de-clutching through the clutch booster and a shifting from third to second speed as the speed controlled valve 108 is actuated by the decreasing speed of the vehicle. Since the vacuum line 60 is cut off from the vacuum source by the secondary control valve 118 when the accelerator is released, the transmission will shift from second speed into neutral as the vehicle continues to coast to a stop. It will therefore be apparent that there is no possibility of the transmission being in any position other than neutral when the vehicle is at a standstill.

It will be further apparent that there can be no shifting of the transmission mechanism without complete release of the accelerator, the release being at least sufficient to bring into effect the lost motion connection 22 with the carburetor. Furthermore, this release which positively actuates the valve 38 to establish communication between the vacuum source and the other vacuum lines need only be momentary to effect the de-clutching and shifting action. This is because subsequent depression of the accelerator after such momentary release does not positively actuate the primary valve 38, which valve remains in open position until the various lines have been exhausted and the secondary valves have shifted to thereby vent the central portion of valve 38 to air. At this point the valve 38 is drawn forwardly by the suction established in the forward part of the primary control valve through the passage 116.

It will be seen that the shifting of the gears will take place automatically immediately following a momentary release and subsequent depression of the accelerator pedal. This is secured by the selecting function of the speed controlled valve 108, which becomes operative once communication with the vacuum source has been established by the primary valve.

I claim:

1. In an automotive vehicle including an engine intake manifold, a clutch, transmission mechanism, and a free-wheeling unit, means operable by the vacuum in said manifold to successively throw out said clutch, throw said free-wheeling unit from locked-out to free-wheeling position, and actuate the gears of said transmission, said means including a plurality of pressure differential operated motors, and further including a valve mechanism automatically operable in accordance with the speed of the vehicle to determine the operation of said transmission operating mechanism.

2. In an automotive vehicle provided with a clutch, a transmission, a throttle, and a throttle operating accelerator, power means for operating the clutch and transmission, said means comprising an accelerator and power operated primary valve, an accelerator and power operated secondary valve and a speed controlled valve together with means for interlocking said valves to provide a fluid interlock therebetween.

3. In an automotive vehicle having an engine, an intake manifold, a throttle, an accelerator for controlling the operation of said throttle, transmission mechanism and a clutch, means including a clutch operating pressure differential operated motor and a transmission operating pressure differential operated motor both of said motors being rendered operative by means controlled by said accelerator and being operative to successively declutch the engine and shift the transmission gears, said declutching means including a valve mechanism operable by the power element of the clutch operating motor, said valve mechanism being operable to insure declutching prior to gearshifting and operable in the reverse manner to insure gearshifting prior to re-engagement of the clutch.

4. The combination of an internal combustion engine, a vacuum operated clutch operating mechanism comprising a single acting pressure differential operated motor, a vacuum operated gearshift, a fuel control element, means whereby the operation of the clutch is dependent upon the position of the fuel control element, and means mounted on the suction side of said motor and operated by the power element thereof to make the vacuum available to the gearshift when the clutch is in a predetermined position.

5. The combination with a source of vacuum, a fuel control element, a change-speed transmission and a clutch, of a vacuum operated clutch operating mechanism comprising a pressure differential operated motor including a piston, a valve operatively connected with the fuel control element for in part controlling the operation of said motor, a vacuum operated transmission operating mechanism comprising a pressure differential operated motor and means for controlling the operation of the transmission operating mechanism comprising means operated by the piston of the clutch operating pressure differential operated motor and mounted on the cylinder of said motor, a manually operated selector means, and further comprising a governor operated means, said aforementioned mechanism being so constructed and arranged as to effect a disengagement of the clutch when the fuel control element is moved to its engine idling position and to make possible an operation of the transmission when and only when the clutch is disengaged.

ROY S. SANFORD.